March 5, 1929.  A. FIEDLER  1,704,124
IDENTIFIABLE MOTION PICTURE PRINT AND METHOD OF MAKING SAME
Filed Sept. 17, 1924
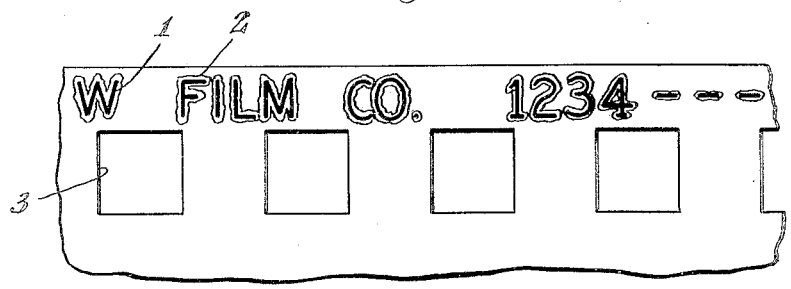
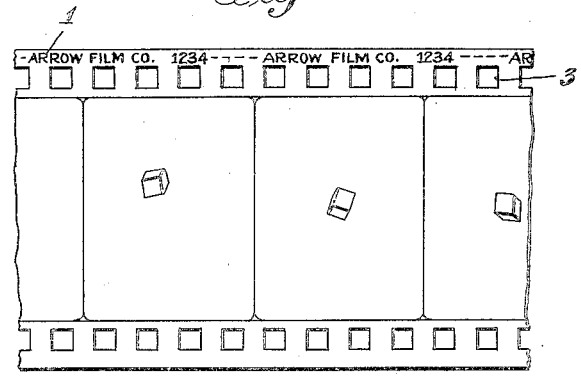
INVENTOR.
Albert Fiedler
BY
ATTORNEY Patented Mar. 5, 1929.

1,704,124

UNITED STATES PATENT OFFICE.

ALBERT FIEDLER, OF WEEHAWKEN, NEW JERSEY.

IDENTIFIABLE MOTION-PICTURE PRINT AND METHOD OF MAKING SAME.

Application filed September 17, 1924. Serial No. 738,296.

My invention relates to printed motion picture films and more particularly to devices or methods of producing printed films that may be individually identifiable so that two or more printed films of the same motion picture may be distinguished from each other and the ownership and source of origin thereof determined wherever they may be found.

It is the practice in the motion picture industry for the owners of motion pictures to make a large number of prints of each picture produced and to rent one or more prints in a given territory. Under the terms of the rental agreements the owner of the picture retains title to the print and requires its return to him after it has been shown. It has frequently happened, however, that a print will become lost or stolen and ultimately appear in unlicensed hands in other territories in competition with the licensed theaters in those territories. Under such circumstances the owner of the print and the licensed theater both suffer considerable damage and in addition the owner, being unable to identify that particular print as his property, or to trace its course, into the possession of the unauthorized theater, has no means of effectively preventing this wrongful practice.

The object of my invention is to provide a remedy for this condition and to provide means by which each print of a motion picture may be specifically and individually identified from each other print of the same picture wherever it may be found and the ownership and right to possession thereof determined.

The invention may be more clearly understood from the drawings in which—

Fig. I, represents the edge of a strip of motion picture film after the identifying matter has been impressed thereon.

Fig. II, illustrates the print after the gelatin surface broken by the type has been resurfaced.

Certain matter of reference or identifying characteristics of which a record may be kept in books provided for that purpose, is affixed to the celluloid base of the film in such a position that it will be out of the line of the light of the projecting machine and will consequently not be thrown upon the screen when the motion picture is being exhibited in the theater. I prefer for this purpose to place the identifying matter at the edge of the motion picture film outside the perforations provided for the purpose of engaging the teeth of the sprocket wheels of the projecting machine.

It is possible to affix this identifying matter to the raw film before it is printed but under the conditions prevailing in this industry it is not desirable to do so. In applying my invention, I prefer to deal with the film in the laboratory after the process of printing each film is completed. It is then subjected to a further treatment of which the following is a detailed description.

Identifying matter may be applied to the print in a number of ways. One may, for instance, soften the gelatine side of the film by heating it and apply and incorporate with it a new sensitized coat of gelatine. By means of this new coating, one may then photograph the matter of identification upon the edge of the film. If this method is employed the gelatine together with the photographed matter may be easily removed by grinding, scraping or other means. Another method is to print the matter of identification upon the celluloid side of the film in an indelible ink. This also may be removed by grinding or scraping although it is a more difficult matter to do so.

The process, however, which I prefer to follow is to print identification matter as shown in Fig. I, at 1, through the gelatine side of the film in indelible ink. This is done in the following manner. Before making each impression upon the gelatine, I heat the type to the point at which it will soften the gelatine when it strikes the film. The gelatine will then draw away from the type and the impression will be made upon the celluloid base beneath. The hot type will also soften the celluloid and the pressure and heat will cause the printing to be sunk therein. Heating the type to a temperature in the neighborhood of 150° F. is sufficient. The matter of identification is preferably printed upon the whole length of the print between the edge thereof and perforations, 3. It will be found then that, when the print is removed from the press, the gelatine side has been somewhat roughened where the type has struck through as shown at 2. As this condition would gather dirt or cause other damage to the print, I apply to the printed edge of the film, by a process described and claimed in my co-pending application for Letters Patent, Serial No. 715,948, filed May 26th, 1924, a resurfacing material containing a lubricant preferably consisting of gelatine and cocoanut oil dissolved in alcohol and water. For this purpose I may, however, use other compounds mentioned in my said co-pending application and I may omit the lubricant altogether, from the resurfacing material. Other methods of resurfacing the printed edge such as coating it with wax may be used. When the resurfacing is completed, however, and the compounds mentioned have dried and set as shown at 3, the printed matter of identification is impossible to remove by any practical means.

It will thus be possible, if a print of any picture so marked and registered is stolen, to identify it wherever it may be found by reference to the identification matter upon the edge.

In applying the identification marking or matter, I prefer to affix it to the edge of the film outside the perforations 3 and to repeat the same continuously along the whole edge of the film. I also prefer to apply such identification matter to the film after the same has been printed, although the same result could be obtained by affixing such identification matter or marks to the blank films. In the latter case, however, there is considerable danger of damaging the film and destroying or impairing its photographic qualities.

Having thus described my invention what I desire to secure by Letters Patent is:—

1. The method of affixing to a motion picture print marks of identification which consists in removing the gelatine surface from a part of the film, sinking or printing said marks upon the base of the film thus bared, and placing a new surface over said marks.

2. The method of affixing to a motion picture print marks of identification by striking said marks through the gelatine surface and impressing them upon the base of celluloid or other material and resurfacing the portion of the film above said marks.

3. The method of marking motion picture prints which comprises inking type with indelible ink, heating said type, impressing said type upon the edge of the gelatin surface of said printed film thereby causing the gelatin to melt and making an impression upon the celluloid base and then resurfacing the film above the printed matter with a solution of gelatinous material.

4. The method of preparing individually identifiable motion picture prints which consists in making a number of photographic prints of the same picture upon film comprising a celluloid base and a photographically sensitive gelatin surface; then inking type with indelible ink and heating said type; then impressing said heated type upon the edges of said film so as to print through the gelatin surface thereof upon the celluloid base; and resurfacing the film above said printed matter; then changing the type and printing in a similar manner different matter upon each print of said picture.

5. The method of affixing identification marks upon gelatine coated film consisting in printing with hot type and indelible ink through the gelatine surface of the film upon the base of celluloid or other material and then resurfacing the film above the printed matter with a solution of gelatinous material.

6. An exposed and developed motion picture film having identification marks impressed through the gelatinous surface material into the base material and a resurfacing material covering said marks.

7. The method of identifying exposed and developed moving picture films which comprises forcing the means carrying the identifying characters through the gelatinous surface material and into the base material of the film and thereafter applying a resurfacing material over said characters.

8. The method of identifying exposed and developed motion picture films which comprises forcing heated character carrying means through the surface material to the base material and thereafter applying a resurfacing material to the area subjected to heat.

9. The method of identifying exposed and developed motion picture films which comprises impressing characters through the surface material to the base material by the application of heat and pressure and thereafter applying a resurfacing material.

10. An exposed and developed motion picture print having identification marks affixed to the base material thereof on the side bearing the gelatine and a resurfacing material covering said marks.

11. An exposed and developed motion picture film having identifying characters on a portion of its base material from which the surfacing material has been removed and a resurfacing material covering said portion of the base material.

In witness whereof, I have subscribed my name hereto this 22nd day of July, 1924.

ALBERT FIEDLER.